(12) United States Patent
Marcellin et al.

(10) Patent No.: US 8,126,279 B2
(45) Date of Patent: Feb. 28, 2012

(54) LIFTING-BASED VIEW COMPENSATED COMPRESSION AND REMOTE VISUALIZATION OF VOLUME RENDERED IMAGES

(75) Inventors: Michael W. Marcellin, Tuscon, AZ (US); Ali Bilgin, Tucson, AZ (US); Hariharan G. Lalgudi, Tucson, AZ (US); Mariappan S. Nadar, Plainsboro, NJ (US)

(73) Assignees: The University of Arizona, Tucson, AZ (US); Siemens Aktiengesellschaft, Munich (DE)

( * ) Notice: Subject to any disclaimer, the term of this patent is extended or adjusted under 35 U.S.C. 154(b) by 916 days.

(21) Appl. No.: 12/146,582

(22) Filed: Jun. 26, 2008

(65) Prior Publication Data

US 2009/0129690 A1 May 21, 2009

Related U.S. Application Data

(60) Provisional application No. 61/003,619, filed on Nov. 19, 2007.

(51) Int. Cl.
*G06K 9/36* (2006.01)
(52) U.S. Cl. ...................................... 382/232
(58) Field of Classification Search .................. 382/154, 382/382–243; 375/240.01–240.29; 345/419
See application file for complete search history.

(56) References Cited

U.S. PATENT DOCUMENTS

| | | | |
|---|---|---|---|
| 6,917,717 B2 * | 7/2005 | Simard et al. | 382/240 |
| 7,574,064 B2 * | 8/2009 | Hou | 382/240 |
| 7,903,737 B2 * | 3/2011 | Martinian et al. | 375/240.12 |

OTHER PUBLICATIONS

Stegmaier, Simon et al., "A Generic Solution for Hardware-Accelerated Remote Visualization", Joint Eurographics—IEEE TCVG Symposium on Visualization (2002), pp. 87-94.
Levoy, Marc, "Efficient Ray Tracing of Volume Data", ACM Transactions on Graphics, vol. 9, No. 3, Jul. 1990, pp. 245-261.
Daubechies, Ingrid, et al., "Factoring Wavelet Transforms into Lifting Steps", The Journal of Fourier Analysis and Applications, vol. 4, Issue 3, 1998, pp. 247-269.
Chang, Chuo Ling et al., "Light Field Compression Using Disparity-Compensated Lifting and Shape Adaptation", IEEE Transactions on Image Processing, vol. 15, No. 4, Apr. 2006, pp. 793-806.
Levoy, Marc et al., "Light Field Rendering", SIGGRAPH '96, pp. 1-12.
Wiegand, Thomas et al., "Overview of the H.264/AVC Video Coding Standard", IEEE Transactions on Circuits and Systems for Video Technology, vol. 13, No. 7, Jul. 2003, pp. 560-576.
Chu, Tong, et al., "Evaluation and extension of SGI Vizserver", Proceedings of SPIE vol. 4368 (2001), pp. 63-73.
Stegmaier, Simon et al., "Widening the Remote Visualization Bottleneck", Proceedings of the 3rd International Symposium on Image and Signal Processing and Analysis (2003), pp. 174-179.

* cited by examiner

*Primary Examiner* — Ishrat I Sherali
(74) *Attorney, Agent, or Firm* — Donald B. Paschburg

(57) ABSTRACT

A method for compressing 2D images includes determining a depth map for each of a plurality of sequential 2D images of a 3D volumetric image, determining coordinate transformations the 2D images based on the depth maps and a geometric relationship between the 3D volumetric image and each of the 2D image, performing a lifting-based view compensated wavelet transform on the 2D images using the coordinate transformations to generate a plurality of wavelet coefficients and compressing the wavelet coefficients and depth maps to generate a compressed representation of the 2D images.

20 Claims, 7 Drawing Sheets

LIFTING-BASED VIEW COMPENSATED COMPRESSION AND REMOTE VISUALIZATION OF VOLUME RENDERED IMAGES

CROSS-REFERENCE TO RELATED APPLICATIONS

This application claims priority to U.S. Provisional Application No. 61/003,619, filed on Nov. 19, 2007, the disclosure of which is incorporated by reference herein.

BACKGROUND OF THE INVENTION

1. Technical Field

The present disclosure relates generally to the field of image visualization, and more specifically to methods and systems for compressing and remotely visualizing volume rendered images.

2. Discussion of Related Art

With tremendous advances in volume imaging modalities, remote visualization of volumetric images has gained importance in many applications such as medical imaging, nondestructive testing and computational fluid dynamics.

In one method of remote visualization, volumetric data is transmitted from a server to a client and one or more images are rendered on the client from the volumetric data for local display. However, image rendering can be a computationally intensive process, often requiring hardware acceleration to achieve a real time viewing experience. Thus, it is likely that the quality and frame rate would be limited in a client side rendering system.

In another method of remote visualization, the server performs all the rendering using dedicated hardware based on view-point requests from the client. This client-server model is shown in FIG. 1. The server 110 renders images from volumetric data 115 using dedicated hardware (e.g., a hardware accelerated rendering engine). The rendered images are compressed on the server 110. The compressed rendered images are then transmitted from the server 110 to the client 120. The client then decompresses the images for local display. For a given server-client bandwidth, an efficient compression scheme is vital for transmitting high quality rendered images.

Thus, there is a need for methods and systems that can more efficiently compress rendered images and remotely display those images.

SUMMARY OF THE INVENTION

An exemplary embodiment of the present invention provides a method for compressing 2D images. The method includes determining a depth map for each of a plurality of sequential 2D images of a 3D volumetric image, determining coordinate transformations between the 2D images based on the depth maps and a geometric relationship between the 3D volumetric image and each of the 2D images, performing a lifting-based view compensated wavelet transform on the 2D images using the coordinate transformations to generate a plurality of wavelet coefficients, and compressing the wavelet coefficients and depth maps to generate a compressed representation of the 2D images. Each depth map includes a plurality of depths that correspond to points in the corresponding 2D image. Each depth corresponds to a depth of a point in the 3D volumetric image that is representative of an intensity of the point in the 2D image.

An exemplary embodiment of the present invention includes a system for remotely visualizing an image. The system includes a network, a server workstation, a client workstation, and a client display. The server workstation includes a depth map generation unit, a mapping unit, and a compressing unit. The depth map generation unit determines a depth map for sequential 2D images of a 3D volumetric image. The mapping unit determines coordinate transformations between each of the 2D images based on the depth maps and a geometric relationship between the 3D volumetric image and each of the 2D images. The compressing unit performs a lifting-based view compensated wavelet transform on the 2D images using the coordinate transformations to generate a plurality of wavelet coefficients. The compressing unit compresses the wavelet coefficients and depth maps to generate a compressed representation of the 2D images. The client workstation receives the compressed representation of the 2D images across the network and restores the 2D images from the compressed representation. The client display displays the restored 2D images.

An exemplary embodiment of the present invention includes a method for compressing 2D images of a 3D volumetric image. The method includes rendering the 2D images from the 3D volumetric data using ray casting, determining a depth for each point of each 2D image based on a weighted sum of sample point depths in the 3D volumetric image, determining coordinate mappings between each 2D image based on the depths and a geometric relationship between the 3D volumetric image and each of the 2D images, performing a lifting-based view compensated wavelet transform on the 2D images using the coordinate mappings to generate a plurality of wavelet coefficients, and compressing the wavelet coefficients and depths to generate a compressed representation of the 2D images.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF EXEMPLARY EMBODIMENTS

In general, exemplary methods and systems for compressing and remotely visualizing volume rendered images will now be discussed in further detail with reference to FIGS. 1-7.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
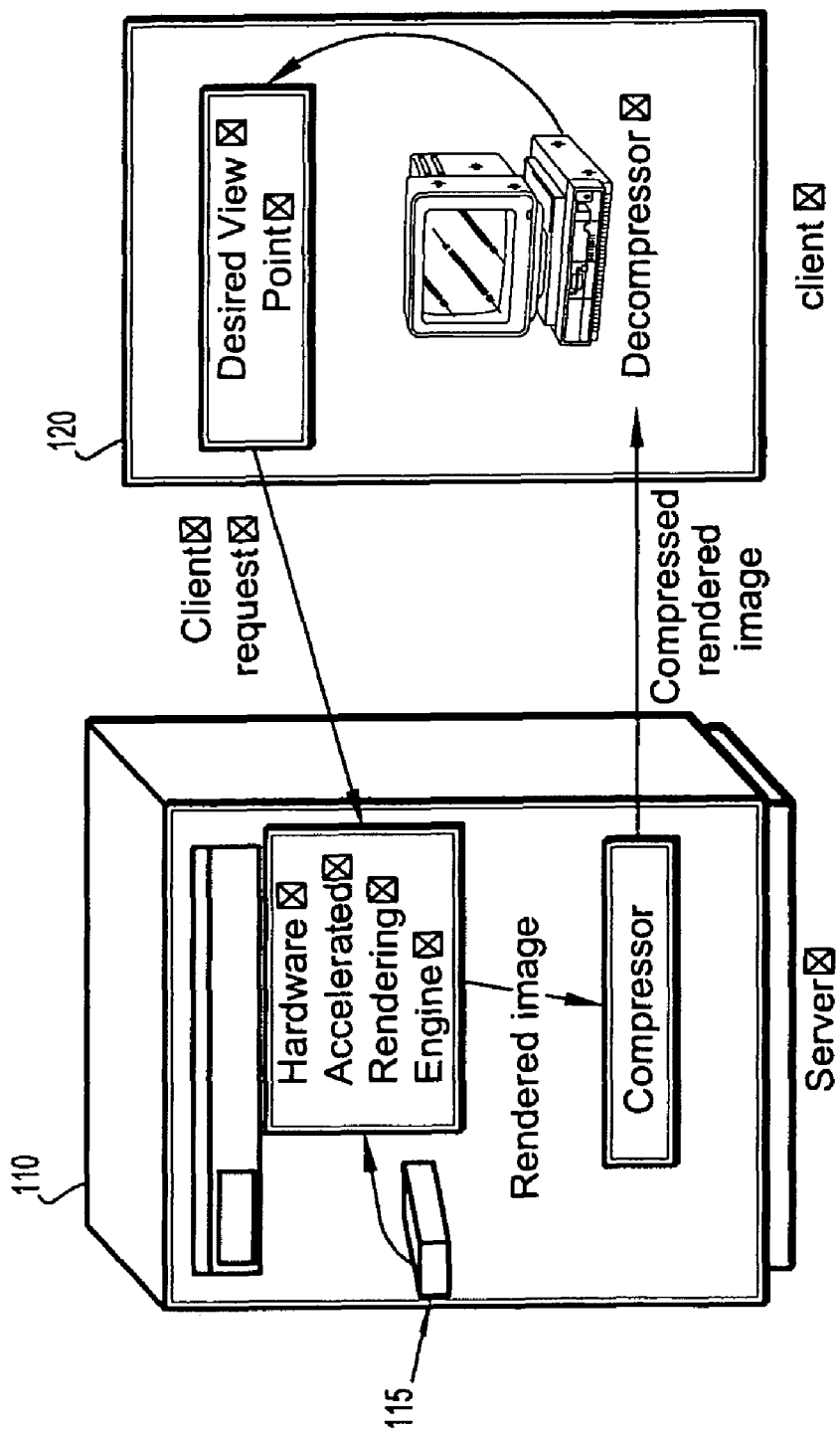
FIG. 1 illustrates a conventional model for performing remote visualization of volumetric data.
Figure 2:
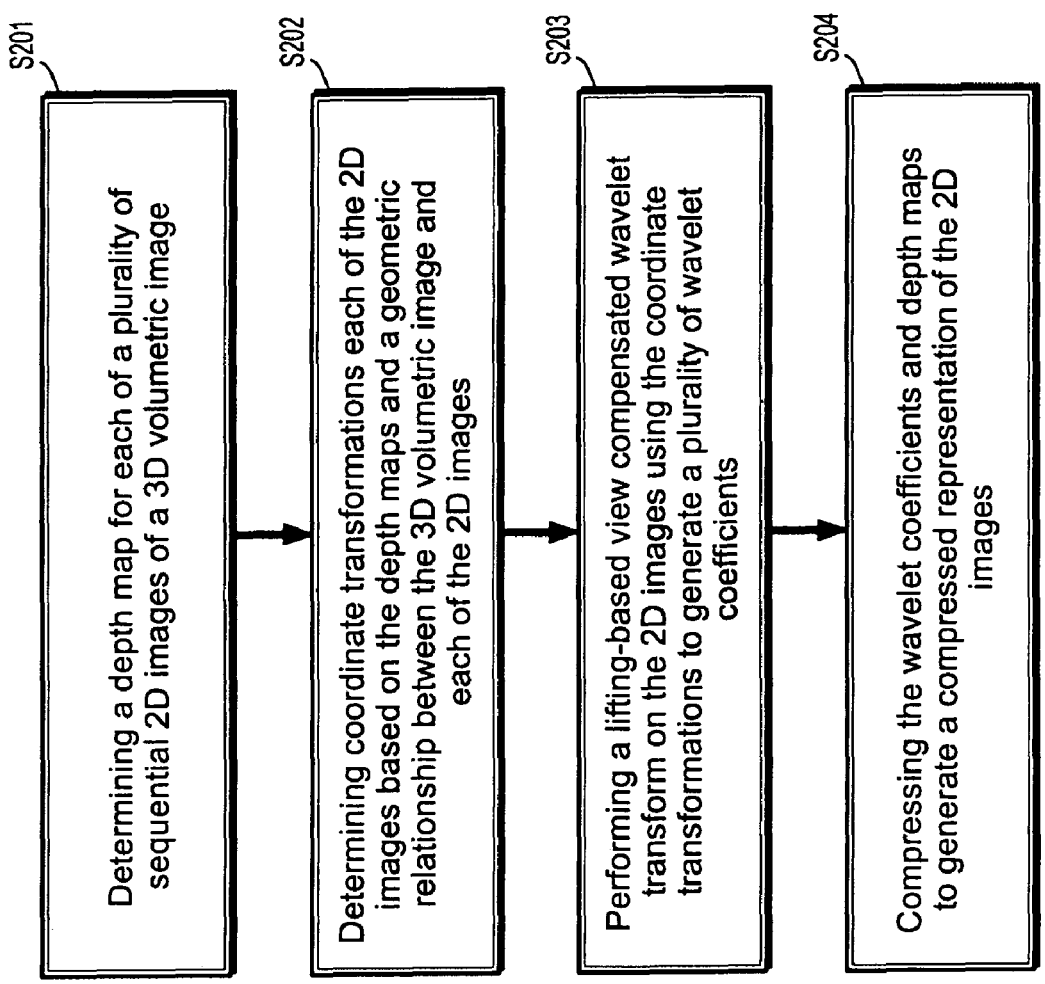
FIG. 2 illustrates a method of compressing rendered images of volumetric data according to an exemplary embodiment of the present invention.

FIG. 2 illustrates a method of compressing rendered images of volumetric data, according to an exemplary embodiment of the present invention. Referring to FIG. 2, the method includes the steps of: determining a depth map for each of a plurality of sequential 2D images of a 3D volumetric image (S201), determining coordinate transformations between each of the 2D images based on the depth maps and a geometric relationship between the 3D volumetric image and each of the 2D images (S202), performing a lifting-based view compensated wavelet transform on the 2D images using the coordinate transformations to generate a plurality of wavelet coefficients (S203), and compressing the wavelet coefficients and depth maps to generate a compressed representation of the 2D images (S204).

Figure 3:
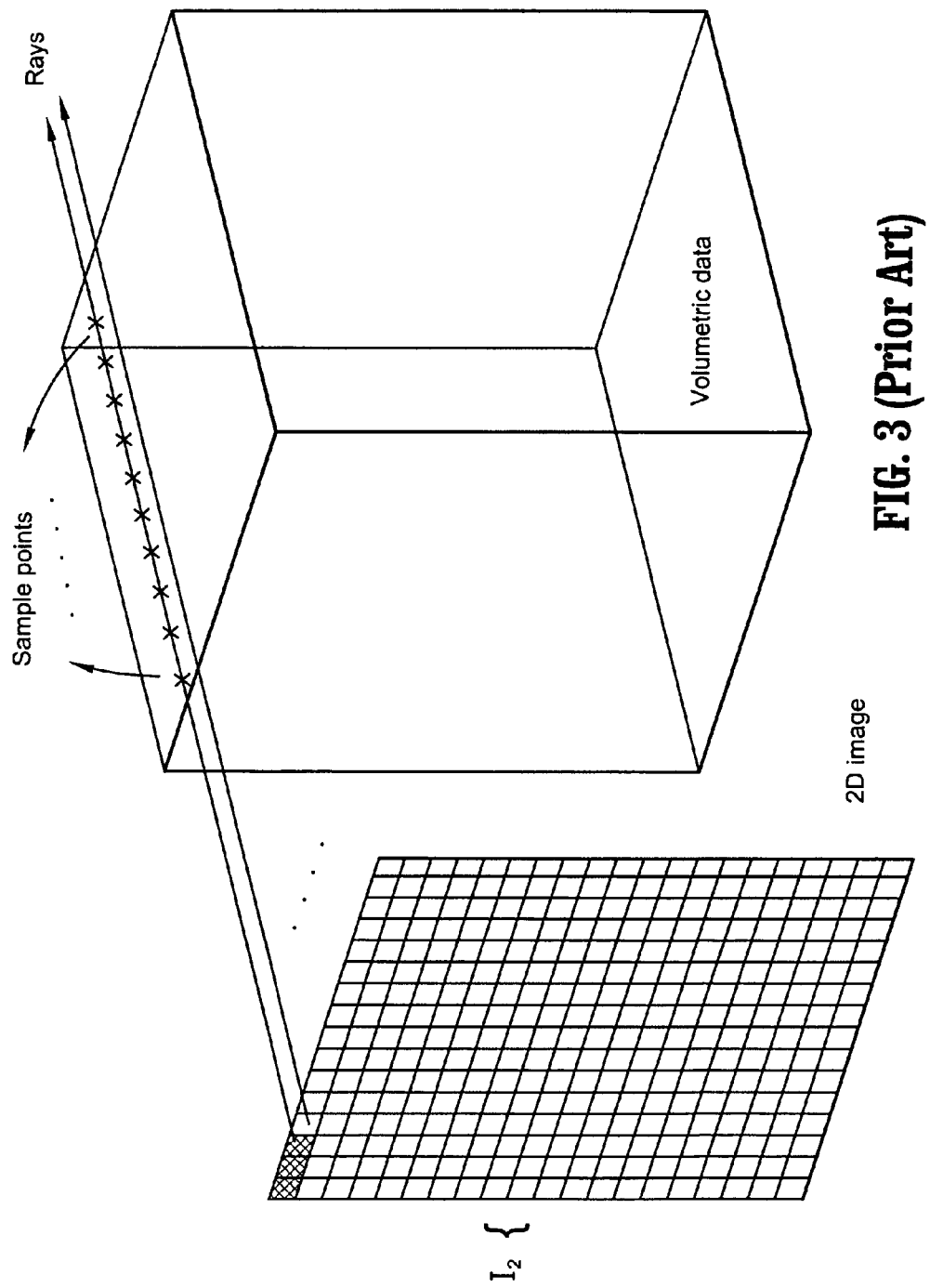
FIG. 3 illustrates a method of using ray casting to render images from volumetric data.
Figure 4:
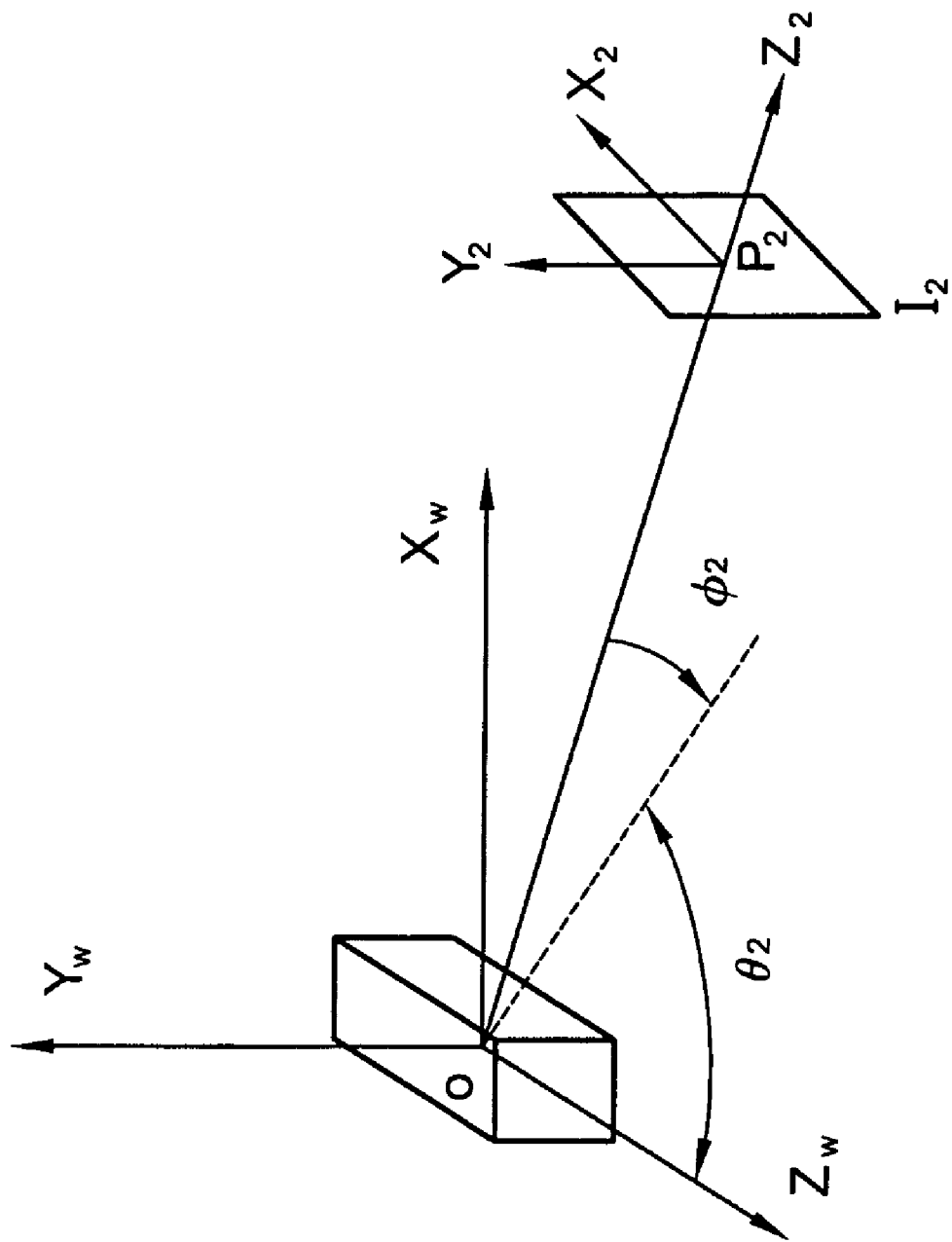
FIG. 4 illustrates a geometric relationship between a rendered image and a volume.

The determination of the depth map and the coordinate transformations will be discussed with reference to FIG. 3 and FIG. 4. FIG. 3 illustrates a method of using ray casting to render a 2D image (e.g., a frame) from volumetric data. FIG. 4 illustrates a geometric relationship between the rendered image and the volume.

Referring to FIG. 3, a ray from each pixel in the image $I_2$ is passed through the volume. The intensities at sample points on the ray are used for computing the pixel value of a point (x, y) from which the ray emerges. The distance into the volume of the sample point on the ray that best describes the pixel value (e.g., an intensity) of the point (x, y) is referred to as the depth of point (x, y). The depth for each point in the image $I_2$ may be calculated using a sum of weighted depths of sample points along a corresponding ray cast from the ray casting. The collection of the depths for each point of the image $I_2$ is referred to as a depth map.

Since every sample point on the ray emanating from point (x, y) can have some contribution to the pixel value, a centroid depth value $C_2(x_2, y_2)$ is computed. Referring to FIG. 4, the ray is considered to be along the $Z_2$ axis. The sample point i distance $z_2^i$ is weighted by the fractional contribution of the sample point to the pixel value. The equation for determining the red component $C_2^r(x_2, y_2)$ of the centroid depth $C_2(x_2, y_2)$ may be represented by equation 1 as follows:

$$C_2^r(x_2, y_2) = \sum_{i=1}^{N(x_2, y_2)} z_2^i * \hat{r}(x2, y2, z_2^i) / I_2^r(x2, y2). \tag{1}$$

$\forall (x2, y2)$ s.t. $I_2^r(x2, y2) \neq 0$.

The parameters $x_2$, $y_2$, and $z_2$ respectively represent the x, y, and z components of the image $I_2$ at a viewpoint $P_2$. A viewpoint is a view of the volume from a particular perspective that yields a 2D image, such as image $I_2$. The viewpoint $P_2$ is parameterized by a distance $d_2$, azimuth $\theta_2$ and elevation $\phi_2$ with respect to the $X_w, Y_x, Z_x$ axes of the world coordinate system of the volume. The line $OP_2$ subtends angles $\theta_2$ and $\phi_2$ with planes $Y_w Z_w$ and $X_w Z_w$, respectively. A view coordinate system $v_2 \equiv X_2 Y_2 Z_2$ is formed with view-point $P_2$ as the origin and line $P_2 O$ as the negative $Z_2$ axis. The image $I_2$ of dimension L×L is formed on the plane $X_2 Y_2$, where L is the diagonal length of the volumetric data. The dimension L should be set to ensure a sufficient number of pixels in the image to cover the volume at any view-point.

The number of sample points on the ray is denoted as $N(x_2, y_2)$. The parameter $I_2^r(x2,y2)$ represents the red component of the image $I_2$. The parameter $I_2^r(x2,y2)$ may be represented by the following equation 2:

$$I_2^r(x_2, y_2) = \sum_{i=1}^{N(x_2,y_2)} \hat{r}(x2, y2, z_2^i) \tag{2}$$

where $$\hat{r}(x_2, y_2, z_2^i) = r(x_2, y_2, z_2^i) * \alpha(x2, y2, z_2^i) * \prod_{j=1}^{i-1} (1 - \alpha(x2, y2, z_2^j)).$$

The parameter $\alpha$ represents the opacity (e.g., degree of transparency) of a sample point i. A normalized opacity value between 0 and 1 may be used, where 1 represents fully opaque and 0 represents fully transparent.

The green and blue components $C_2^g(x_2,y_2)$ and $C_2^b(x_2,y_2)$ may be computed in a manner similar to those discussed above with respect to equation 1 to compute the final centroid depth $C_2(x_2, y_2)$. Thus, a depth map, including depth values for each non-zero pixel in image $I_2$ is generated. For pixels with $I_2^r(x_2,y_2)=0$, the value of $C_2^r(x_2,y_2)$ is taken to be the depth value at a pixel that is closest to point $(x_2,y_2)$ in the row $x_2$. If any of the depths are still zero, the above approach is repeated on column y2. The above approach for generating depth maps can be repeated for each of the sequential 2D images referenced in FIG. 2 so that a depth map may be determined for each of the sequential 2D images (see S201 of FIG. 2).

Referring to FIG. 4, assume another image $I_1$ (not shown) has been rendered at viewpoint $P_1$ with parameters $d_1$, azimuth $\theta_1$ and elevation $\phi_2$ with respect to the $X_w, Y_x, Z_x$ axes of the volume of the world coordinate system. The depth map generated for image $I_2$ and the geometric relationship between $I_2$ and the volumetric data can be used to predict the pixels values of image $I2$ (from image $I_1$). Based on coordinate system transformations, it can be shown that a point, represented as $(x_2, y_2, z_2)$, in view coordinate system v2, can be transformed to the world coordinate representation $(x_w, y_w, z_w)$ through the matrix multiplication defined by equation 3 as follows:

$$\begin{pmatrix} x_w \\ y_w \\ z_w \\ 1 \end{pmatrix} = M_{2 \to w} * \begin{pmatrix} x_2 \\ y_2 \\ z_2 \\ 1 \end{pmatrix} \quad (3)$$

where $$M_{2 \to w} = \begin{pmatrix} \cos(\theta_2) & -\sin(\theta_2)*\sin(\phi_2) & \sin(\theta_2)*\cos(\phi_2) & d*\sin(\theta_2)*\cos(\phi_2) \\ 0 & \cos(\phi_2) & \sin(\phi_2) & d*\sin(\phi_2) \\ -\sin(\theta_2) & -\cos(\theta_2)*\sin(\phi_2) & \cos(\theta_2)*\cos(\phi_2) & d*\cos(\theta_2)*\cos(\phi_2) \\ 0 & 0 & 0 & 1 \end{pmatrix}.$$

Similarly, the world coordinate system can be transformed to view coordinate system $v_1$ using $M_{w \to 1}$. Thus, transformations from coordinate system $v_2$ to $v_1$ can be accomplished using $M_{2 \to 1}$ where $M_{2 \to 1} = M_{w \to 1} * M_{2 \to w}$.

For the red component of the pixel $(x_2, y_2)$ in image $I_2$, the coordinate system $v_2$ location corresponding to the centroid depth value is $(x_2, y_2, C_2^r(x_2, y_2)) (x_2, y_2)$. This representation, can be transformed to view coordinate system $v_1$ to locate the red component of pixel $(x_1^r, y_1^r)$ in image $I_1$ using equation 4 as follows:

$$\begin{pmatrix} x_1^r \\ y_1^r \end{pmatrix} = \tilde{M}_{2 \to 1} * \begin{pmatrix} x2 \\ y2 \\ C_2^r(x_2, y_2) \\ 1 \end{pmatrix}, \quad (4)$$

where $\tilde{M}_{2 \to 1}$ is a 2×4 matrix containing the first 2 rows of $M_{2 \to 1}$. The same can be repeated for the green and blue components of the pixel $(x_2, y_2)$ to determine the green and blue components of pixel $(x1, y1)$. Thus, using depth map $C_2$, a geometric mapping (e.g., a transformation) from image $I_2$ to image $I_1$ may be obtained. This geometric transformation is denoted $\mu_{2 \to 1}$.

The above transformation generation procedure can be repeated for each of the sequential 2D images referenced in FIG. 2 so that coordinate transformations between each of the 2D images are determined (See S202 of FIG. 2).

Once the coordinate transformations have been determined, as discussed above with reference to FIG. 2, a lifting-based view compensated wavelet (LVCWT) transform is performed on the 2D images using the determined coordinate transformations to generate a plurality of wavelet coefficients (S203) and the wavelet coefficients and depth maps are compressed to generate a compressed representation of the 2D images (S204).

Figure 5:
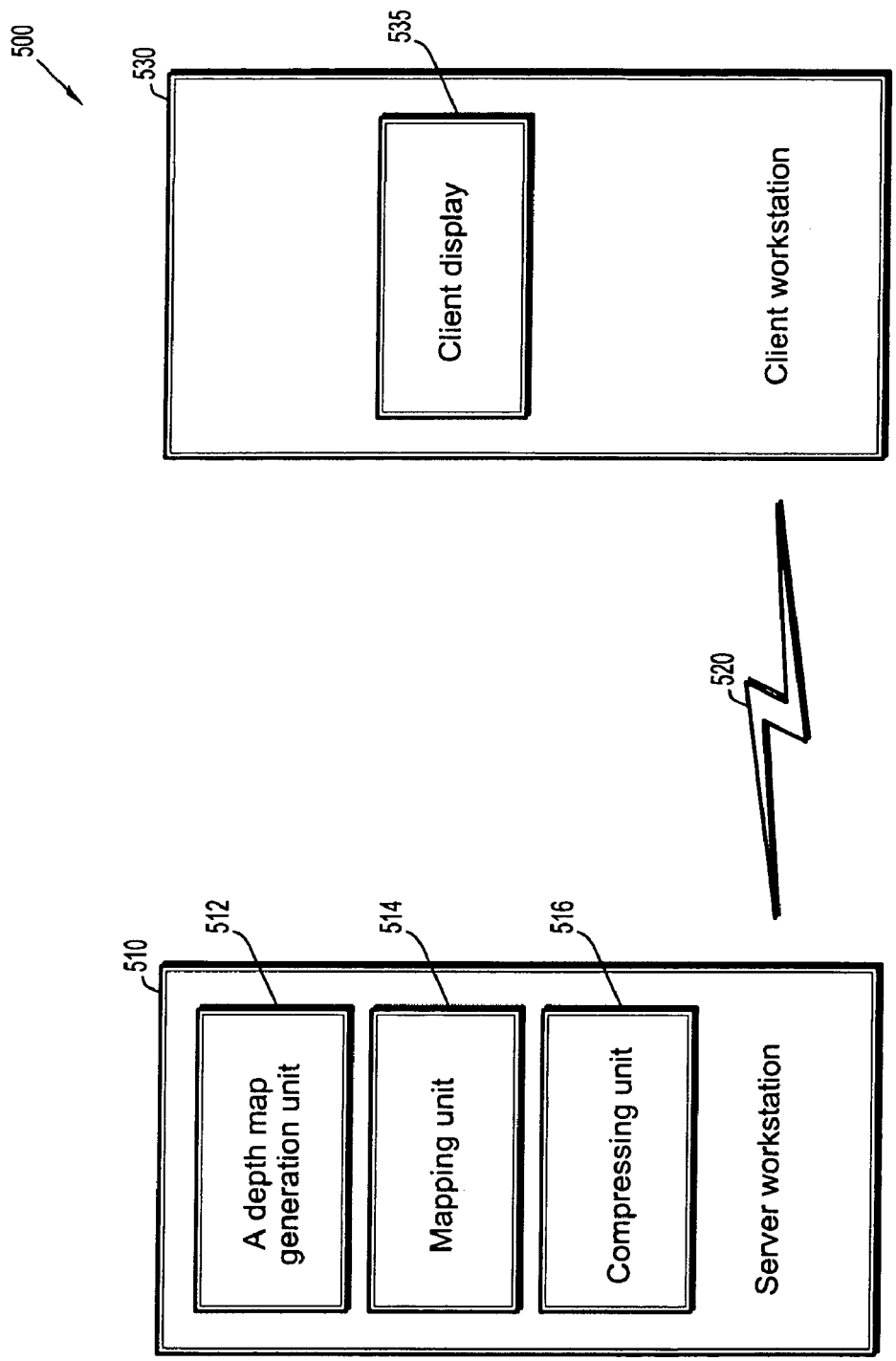
FIG. 5 illustrates a high-level block diagram of a system for remotely visualizing volumetric images, according to an exemplary embodiment of the present invention.

FIG. 5 is a high-level block diagram of a system of remotely visualizing images, according to an exemplary embodiment of the present invention. The system 500 includes a network 520, a server workstation 510, a client workstation 530, and a client display 535.

The server workstation 510 includes a depth map generation unit 512, a mapping unit 514, and a compressing unit 516. The depth map generation unit 512 determines the depth maps for sequential 2D images of a 3D volumetric image.

The mapping unit 514 determines the coordinate transformations between each of the 2D images based on the depth maps and a geometric relationship between the 3D volumetric image and each of the 2D images.

The compressing unit 516 performs the lifting-based view compensated wavelet transform on the 2D images using the coordinate transformations to generate a plurality of wavelet coefficients. The compressing unit 516 compresses the wavelet coefficients and depth maps to generate a compressed representation of the 2D images.

The client workstation 530 receives the compressed representation of the 2D images across the network and restores the 2D images from the compressed representation. The client display 535 displays the restored 2D images.

While not illustrated in FIG. 5, the client workstation 530 may further include a client input device (e.g., a mouse, keyboard, etc.) that enables a user to select desired viewpoints. The client workstation 530 may then send the selected viewpoints across the network to the server workstation 510 so that the server workstation 510 can render the 2D images based on the received viewpoints.

Figure 6:
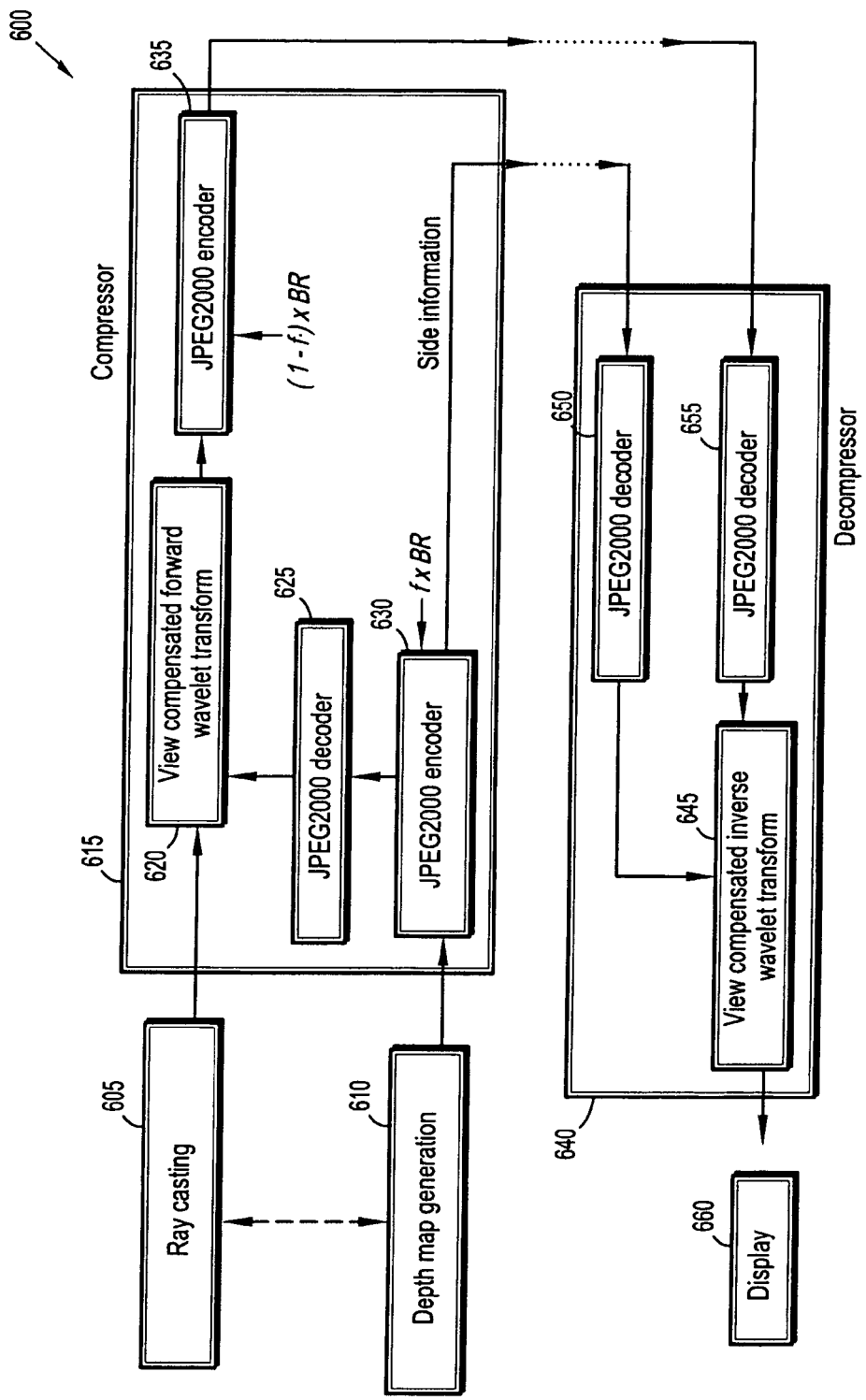
FIG. 6 illustrates a system for remotely visualizing volumetric images, according to another exemplary embodiment of the present invention.
Figure 7:
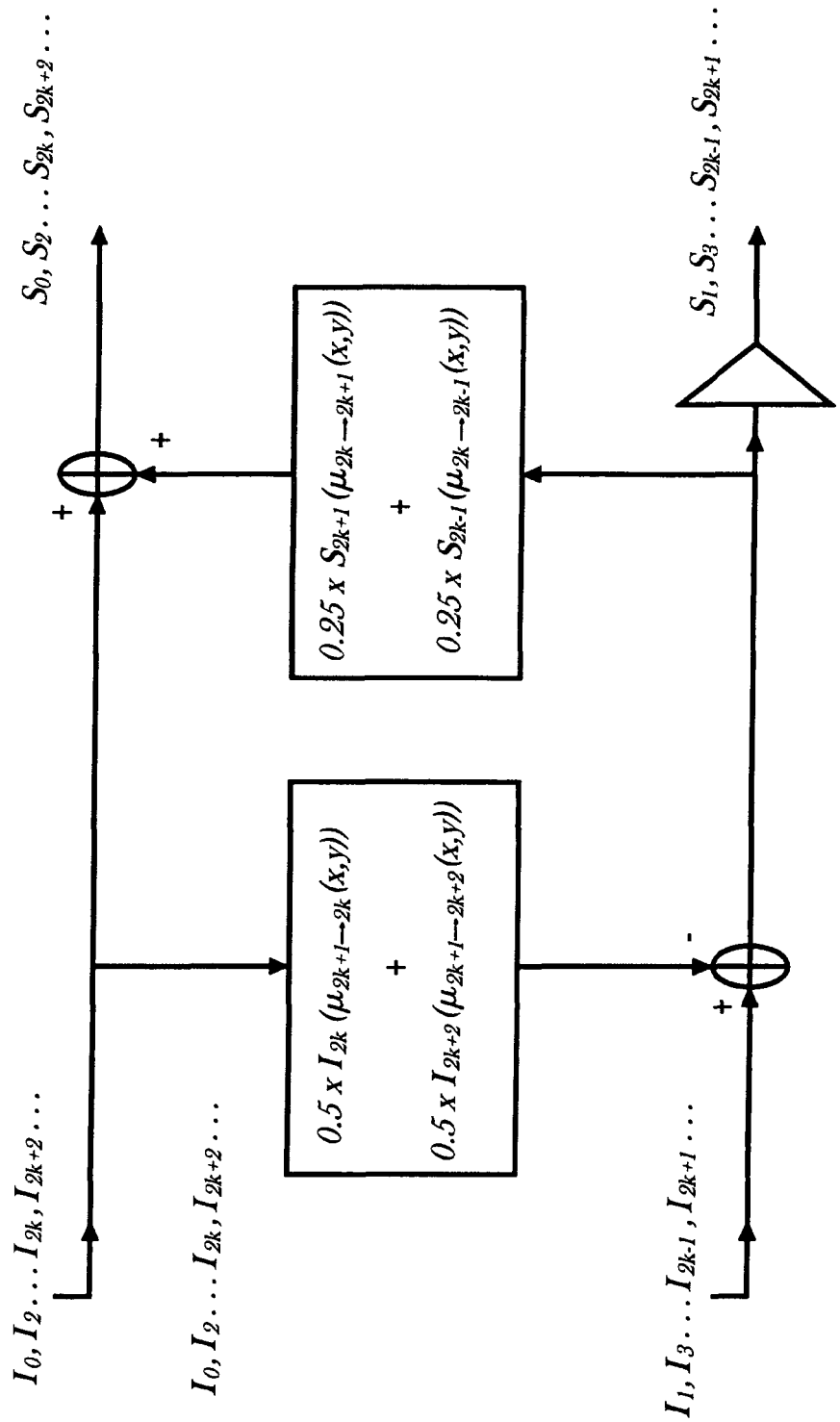
FIG. 7 illustrates a lifting-based view compensated wavelet transform according to an exemplary embodiment of the present invention.

The performance of the LVCWT transform and the compression of the wavelet coefficients will be described with reference to FIG. 6 and 7. FIG. 6 illustrates a more detailed system for remotely visualizing volumetric images, according to an exemplary embodiment of the present invention. Referring to FIG. 6, the system 600 includes a ray casting unit 605, a depth map generation unit 610, a compressor 615, a de-compressor 640, and a display. FIG. 7 illustrates a LVCWT transform, according to an exemplary embodiment of the present invention.

The ray casting unit 605, depth map generation unit 610, and compressor 615 may be disposed within a server workstation. The de-compressor 640 may be disposed within a client workstation connected to the server via a network. The ray casting unit 605 may render the 2D images from volumetric data using the ray casting described above. The ray casting may be performed by a hardware rendering engine included within the ray casting unit 605 of the server. The depth map generation unit 610 may generate depth maps for each of the rendered 2D images as described above.

The compressor 615 includes a lifting-based view compensated wavelet transforming unit 620, a first jpeg2000 decoder 625, a first jpeg2000 encoder 630, and a second jpeg2000 encoder 635. The de-compressor 640 includes a lifting-based view compensated inverse wavelet transforming unit 645, a first JPEG2000 decoder 650, and a second JPEG2000 decoder 655. While not shown in FIG. 6, the client workstation may further include a graphical processing unit (GPU) to perform the inverse wavelet transform.

The lifting-based view compensated wavelet transforming unit 620 performs a lifting-based view compensated wavelet transform on the rendered images. A lifting-based view compensated wavelet transform is a modified form of a lifting-based wavelet transform.

Referring to the lifting-based wavelet transform, assume that images $I_0, I_1, \ldots, I_{2k}, I_{2k+1}, \ldots$, denote the sequence of rendered images corresponding to view-points $P_0, P_1, \ldots,$ $P_{2k}$, $P_{2k+1}$, ..., respectively. The rendered images are all of size L×L. The 5/3 wavelet transform across the sequence of rendered images is first considered. In a first lifting step (e.g., a prediction step), the pixel value of point (x, y) in an odd-indexed image is predicted from the pixel value of point (x, y) in the neighboring even-indexed images. The prediction residual (e.g., high pass coefficients) is given by equation 5a as follows:

$$S_{2k+1}(x,y)=I_{2k+1}(x,y)-\tfrac{1}{2}[I_{2k}(x,y)+I_{2k+2}(x,y)]. \quad (5a)$$

In a second lifting step (e.g., an update step), the low pass coefficients are obtained using equation 5b as follows:

$$S_{2k}(x,y)=I_{2k}(x,y)+\tfrac{1}{4}[S_{2k-1}(x,y)+S_{2k+1}(x,y)]. \quad (5b)$$

The high pass coefficients are then scaled by a half.

The lifting-based wavelet transform is preferred over other transforms because it remains invertible, even when non-invertible operations are performed inside the lifting steps. The lifting-based view compensated wavelet transform (LVCWT) is generated by incorporating the previously determined coordinate transformations into the lifting steps.

A geometric transformation (e.g., mapping) from image $I_i$ to image $I_j$ is denoted as $\mu_{i \to j}$. In a first lifting step of LVCWT, the pixel value of a point (x, y) in $I_{2k+1}$ is predicted from pixels $\mu_{2k+1 \to 2k}(x,y)$ and $\mu_{2k+1 \to 2k+2}(x,y)$ in image $I_{2k}$ and image $I_{2k+2}$ respectively. The prediction residual is then given by equation 6a as follows:

$$S_{2k+1}(x,y)=I_{2k+1}(x,y)-\tfrac{1}{2}[I_{2k}(\mu_{2k+1 \to 2k}(x,y))+I_{2k+2}(\mu_{2k+1 \to 2k+2}(x,y))]. \quad (6a)$$

Since $\mu_{2k+1 \to 2k}(x,y)$ and $\mu_{2k+1 \to 2k+2}(x,y)$ may be non-integers, interpolation may be used to compute the pixel value. For example, the pixel value may be computed using various interpolation methods such as linear interpolation, cubic-convolution, B-spline interpolation, etc. In the second lifting step, the pixel value of the point (x, y) in $I_{2k}$ is updated with pixels $\mu_{2k \to 2k-1}(x,y)$ and $\mu_{2k \to 2k+1}(x,y)$ in $S_{2k-1}$ and $S_{2k+1}$ respectively. The resulting low pass coefficients are given by equation 6b as follows:

$$S_{2k}(x,y)=I_{2k}(x,y)+\tfrac{1}{4}[S_{2k-1}(\mu_{2k \to 2k-1}(x,y))+S_{2k+1}(\mu_{2k \to 2k+1}(x,y))]. \quad (6b)$$

The high pass coefficients are then scaled by half.

The high and low pass coefficients may be interpreted as high and low pass coefficient frames. For example, high pass coefficient frames are generated using a coordinate transformation from a first viewpoint to a prior viewpoint and a coordinate transformation from the first viewpoint to a future viewpoint. Low pass coefficient frames are generated using a coordinate transformation from a second viewpoint to a prior viewpoint and a coordinate transformation from the second viewpoint to a future viewpoint.

Each coordinate transformation may include a first and a second coordinate transformation. The first coordinate transformation maps points from an origin viewpoint of the 3D volume to a viewpoint of a first one of the images. The second coordinate transformation maps points from a viewpoint of a second one of the images to the origin viewpoint. The first and second coordinate transformations may be represented respectively as first and second matrixes, where the coordinate transformation may be determined by performing a matrix multiplication on the first and second matrixes. As described above, each matrix includes parameters of distance d, azimuth angle θ, and elevation angle φ with respect to a view-point from which the 3D volume is viewed.

In the inverse LVCWT, high pass coefficients are first scaled by 2. The lifting steps are then applied in reverse order with signs of the prediction and update values reversed. While an exemplary embodiment of the present invention has been described using the 5/3 wavelet transform, the above approach may be applied to any transform that can be factorized into lifting steps.

Referring back to FIG. 6, the first jpeg2000 encoder unit 630 compresses the depth maps as side information. Each depth map may be coded independently. The encoder may only use a fraction f of the target bit rate to generate the side information. The second jpeg2000 encoder 635 of the compressor 615 compresses the upper and lower coefficients generated by the wavelet transforming unit 620. The compressed coefficients and depth maps are sent (e.g., across a network) to the de-compressor 640. The first JPEG2000 decoder 650 of the de-compressor 640 decodes/decompresses the compressed depth maps. The second JPEG2000 decoder 655 of the de-compressor 640 decodes/decompresses the compressed coefficients. The lifting-based inverse view compensated wavelet transforming unit 645 performs a lifting-based inverse view compensated wavelet transform on the de-compressed/decoded coefficients and depth maps to restore the originally rendered 2D images. The restored images can then be visualized on the display 660.

While FIG. 6 illustrates the use of JPEG2000 encoders and decoders, the present invention is not limited thereto. For example, the depth maps and coefficients may be compressed/decompressed using any compression/de-compression technique as contemplated by one of ordinary skill in the art. Although not illustrated in FIG. 6, the depth maps of the depth map generation unit may be sent directly to the wavelet transforming unit 620. While embodiments of the present invention have been discussed with respect to ray casting, images may be rendered using other approaches, such as light field rendering or rendering based on graphical processing units (GPUs).

It is to be understood that the particular exemplary embodiments disclosed above are illustrative only, as the invention may be modified and practiced in different but equivalent manners apparent to those skilled in the art having the benefit of the teachings herein. It is therefore evident that the particular exemplary embodiments disclosed herein may be altered or modified and all such variations are considered within the scope and spirit of the invention.

What is claimed is:

1. A method for compressing 2D images, the method comprising:
   determining a depth map for each of a plurality of sequential 2D images of a 3D volumetric image, each depth map including a plurality of depths that correspond to points in the corresponding 2D image, each depth corresponding to a depth of a point in the 3D volumetric image that is representative of an intensity of the point in the 2D frame;
   determining coordinate transformations between the 2D images based on the depth maps and a geometric relationship between the 3D volumetric image and each of the 2D images;
   performing a lifting-based view compensated wavelet transform on the 2D images using the coordinate transformations to generate a plurality of wavelet coefficients; and
   compressing the wavelet coefficients and depth maps to generate a compressed representation of the 2D images.

2. The method of claim 1, wherein the geometric relationship comprises a distance, an elevation angle, and an azimuth angle between the 3D volumetric image and each of the 2D images.

3. The method of claim 1, wherein performing a lifting-based view compensated wavelet transform comprises:
generating high pass coefficient frames using a coordinate transformation from a first viewpoint to a prior viewpoint and a coordinate transformation from the first viewpoint to a future viewpoint; and
generating low pass coefficient frames using a coordinate transformation from a second viewpoint to a prior viewpoint and a coordinate transformation from the second viewpoint to a future viewpoint.

4. The method of claim 1, wherein each coordinate transformation comprises:
a first coordinate transformation from an origin viewpoint of the 3D volume to a viewpoint of a first one of the 2D images; and
a second coordinate transformation from a viewpoint of a second one of the 2D images to the origin viewpoint.

5. The method of claim 4, wherein the first and second coordinate transformations are respectively represented as a first matrix and a second matrix, and the coordinate transformation is determined by performing a matrix multiplication on the first and second matrixes.

6. The method of claim 1, wherein the 2D images are restored by:
decompressing the compressed representation of the 2D images to generate restored wavelet coefficients and restored depth maps; and
performing a lifting-based view compensated inverse wavelet transform on the restored wavelet coefficients using the restored depth maps.

7. The method of claim 1, further comprising rendering the 2D images from the 3D volumetric image using ray-casting.

8. A system for performing remote visualization of an image, the system comprising:
a network;
a server workstation comprising:
a depth map generation unit to determine a depth map for sequential 2D images of a 3D volumetric image;
a mapping unit to determine coordinate transformations between the 2D images based on the depth maps and a geometric relationship between the 3D volumetric image and each of the 2D images; and
a compressing unit to performing a lifting-based view compensated wavelet transform on the 2D images using the coordinate transformations to generate a plurality of wavelet coefficients and compress the wavelet coefficients and depth maps to generate a compressed representation of the 2D images;
a client workstation to receive the compressed representation of the 2D images across the network and to restore the 2D images from the compressed representation; and
a client display to display the restored 2D images.

9. The system of claim 8, wherein the client workstation comprises a decompressing unit to decompress the compressed representation of the 2D images to generate restored wavelet coefficients and restored depth maps.

10. The system of claim 9, wherein the client workstation decompressing unit is configured to perform a lifting-based view compensated inverse wavelet transform on the restored wavelet coefficients using the restored depth maps.

11. The system of claim 10, wherein the client workstation further comprises a graphical processing unit (GPU) to perform the inverse wavelet transform.

12. The system of claim 8, wherein the compressing unit comprises a JPEG2000 encoder and the compression of the wavelet coefficients and depth maps are performed using the JPEG2000 encoder.

13. The system of claim 9, wherein the decompressing unit comprises a JPEG2000 decoder and the decompression of the wavelet coefficients and depth maps are performing using the JPEG2000 decoder.

14. The system of claim 8, further comprising a hardware rendering engine to render the sequential 2D images from the 3D volumetric image.

15. The system of claim 14, wherein the hardware rendering engine renders the 2D images using ray casting.

16. The system of claim 15, wherein the depth for a point in the 2D frame is calculated using a sum of weighted depths of sample points along a corresponding ray cast from the ray casting.

17. The system of claim 16, wherein the depths of the sample points are weighted based on an amount each of the sample points contribute to the intensity of the point in the 2D frame.

18. The system of claim 8, further comprising a client input device to select desired viewpoints, wherein the client workstation sends the selected viewpoints across the network to the server workstation and the server workstation renders the 2D images based on the received viewpoints.

19. A non-transitory computer readable medium, tangibly embodying a program of instructions executable by the computer to perform method steps for compressing 2D images of a 3D volumetric image, the method comprising:
rendering the 2D images from the 3D volumetric data using ray casting;
determining a depth for each point of each 2D image based on a weighted sum of sample point depths in the 3D volumetric image, wherein each sample point is along a corresponding a ray cast by the ray casting;
determining coordinate mappings between the 2D images based on the depths and a geometric relationship between the 3D volumetric image and the 2D images;
performing a lifting-based view compensated wavelet transform on the 2D images using the coordinate mappings to generate a plurality of wavelet coefficients; and
compressing the wavelet coefficients and depths to generate a compressed representation of the 2D images.

20. The non-transitory computer readable medium of claim 19, wherein the geometric relationship comprises a distance, an elevation angle, and an azimuth angle between the 3D volumetric image and each of the 2D images.

* * * * *